United States Patent Office 3,703,599
Patented Nov. 21, 1972

3,703,599
INSECTICIDAL PHOSPHORIC ACID ESTERS
Zitsuichi Kishikawa, Osaka, and Sadafumi Maekawa, Kawachi-Nagano, Japan, assignors to Nihon Nohyaku Kabushiki Kaisha, Tokyo, Japan
No Drawing. Filed Jan. 16, 1969, Ser. No. 791,769
Int. Cl. A01n 9/36
U.S. Cl. 424—217     11 Claims

ABSTRACT OF THE DISCLOSURE

An insecticide composition comprising at least one of the organic phosphoric acid esters having the following formula:

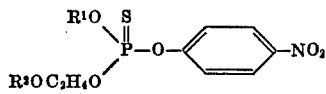

wherein $R^1$ and $R^2$ respectively stand for lower alkyl radicals and an inert carrier.

DESCRIPTION OF THE INVENTION

The present invention relates to an insecticide composition containing as its active ingredient at least one of the organic phosphoric acid esters having the formula:

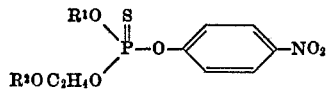

wherein $R^1$ and $R^2$ respectively stand for lower alkyl radicals and an inert carrier.

The object of the present invention is to provide an insecticide which is cheap and hardly toxic to the warm-blooded animals.

The compounds represented by the above-mentioned general formula can be easily synthesized with good yield through the following reaction in which chlorothiophosphate is made to react with 4-nitrophenol or its alkali metal salt:

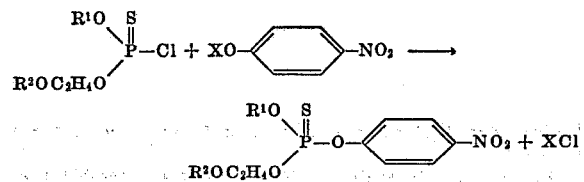

wherein $R^1$ and $R^2$ respectively have the same definition as given above; and X stands for hydrogen atom or alkali metal.

$R^1$ and $R^2$ of the general Formula I which may be same or different each other respectively stand for lower alkyl radicals such as methyl, ethyl, propyl, isopropyl, butyl, isobutyl, secondary butyl and tertiary butyl radicals. As examples of chlorothiophosphate are illustrated O-methyl O-2-methoxyethyl chlorothiophosphate, O-methyl O-2-ethoxyethyl chlorothiophosphate, O-ethyl O-2-methoxyethyl chlorothiophosphate, O-ethyl O-2-ethoxyethyl chlorothiophosphate, O-ethyl O-2-isopropoxyethyl chlorothiophosphate, and O-isopropyl O-2-methoxyethyl chlorothiophosphate.

For the reaction for the synthesis according to the present invention, either free phenol compound or an alkali metal salt of it may be used. In the former case, it is desired to have an appropriate deoxidizer, for example, an organic or inorganic base, coexisted: Particularly, the presence of carbonate or hydrogencarbonate of alkali metal remarkably promotes the reaction. These reactions may be carried out in the absence of any solvent, but they are generally carried out under the presence of a solvent which is selected from ketones such as methylethylketone or methylisobutylketone, aromatic hydrocarbons such as benzene or toluene, alcohols such as methanol, water or a mixture of them.

The reaction temperature is selected among the range from room temperature to about 120° C., preferably among 30 to 80° C.

The process for producing the inventive compounds as active ingredients of the present insecticide can be completed by one of the following three manners: by reacting alkalimetal salt of 4-nitrophenol with thiophosphoric chloride which is dissolved in a solvent, while stirring; by dissolving 4-nitrophenol in a solvent, adding alkali metal salt there and reacting the resultant mixture with thiophosphoric chloride; or by adding alkali metal salt to a mixed solution which contains 4-nitrophenol and thiophosphoric chloride for reaction thereamong. Upon completion of the reaction, salts formed by the reaction is either filtered away or dissolved with water to separate and eliminate therefrom an organic layer. The solvent is distilled off to be recovered from the organic layer, whereby the end product which is of sufficiently high purity for practical use is obtained.

Examples of the organic phosphoric acid esters for use in the insecticide according to the present invention are illustrated as follows:

(1) 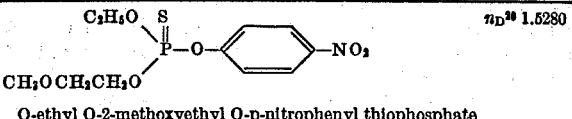
O-ethyl O-2-methoxyethyl O-p-nitrophenyl thiophosphate    $n_D^{20}$ 1.5280

(2) 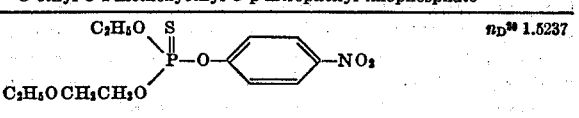
O-ethyl O-2-ethoxyethyl O-p-nitrophenyl thiophosphate    $n_D^{20}$ 1.5237

(3) 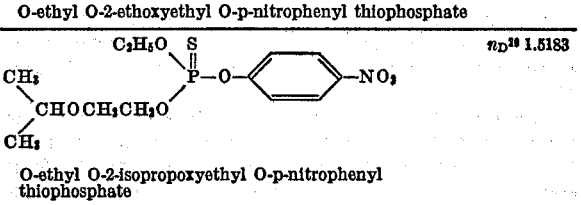
O-ethyl O-2-isopropoxyethyl O-p-nitrophenyl thiophosphate    $n_D^{20}$ 1.5183

| | | |
|---|---|---|
| (4) | 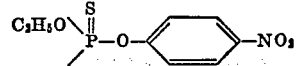 O-ethyl O-2-n-propoxyethyl O-p-nitrophenyl thiophosphate | $n_D^{20}$ 1.5270 |
| (5) | 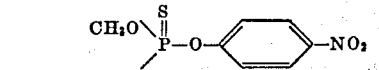 O-methyl O-2-methoxyethyl O-p-nitrophenyl thiophosphate | $n_D^{20}$ 1.5384 |
| (6) | 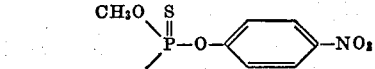 O-methyl O-2-ethoxyethyl O-p-nitrophenyl thiophosphate | $n_D^{20}$ 1.5292 |
| (7) | 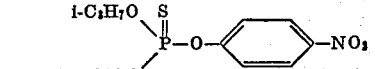 O-isopropyl O-2-methoxyethyl O-p-nitrophenyl thiophosphate | $n_D^{20}$ 1.5235 |
| (8) | 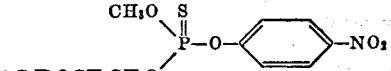 O-methyl O-2-isopropoxyethyl O-p-nitrophenyl thiophosphate | $n_D^{20}$ 1.5217 |
| (9) | 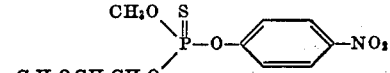 O-methyl O-2-propoxyethyl O-p-nitrophenyl thiophosphate | $n_D^{20}$ 1.5242 |
| (10) | 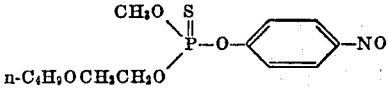 O-methyl O-2-butoxyethyl O-p-nitrophenyl thiophosphate | $n_D^{20}$ 1.5200 |
| (11) | 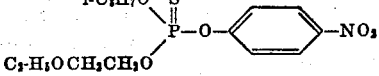 O-isopropyl O-2-ethoxyethyl O-P-nitrophenyl thiophosphate | $n_D^{20}$ 1.5253 |

The compounds represented by the above-given general Formula I exhibits an excellent insecticidal action against insects, acarina, nematode, etc., and can effectively kill the low-land rice pests such as Nephotettix cincticeps, Chilo suppressalis and Laodelphax striatellus. Thus it is found useful as an insecticide for agricultural purpose. The fact that the compounds of the general Formula I are less toxic to the warm-blooded animals and can be produced at small cost also constitutes a great merit of the present invention.

For instance, whereas the toxicity in terms of $LD_{50}$ (mg./kg.) (lethal oral dose to mice) is 6 for parathion and 24 for EPN, the value for the compounds (1) and (2) according to the present invention are 80 and 110 respectively (0.1 ml., per 10 g. of a mouse weight, of the olive oil suspension of the compound administered).

Agricultural chemicals are naturally required to be of low toxicity from the standpoint of public sanitation, as evidenced by the restrictions placed on the use of parathion.

The great feature of the insecticide according to the present invention is that in spite of being similar to parathion in chemical structure, the invented insecticide is over 10 times less toxic to the warm-blooded animals than parathion, yet its insecticidal effect is equal to or higher than that of any other insecticide now in practical use.

The insecticide may, depending on the intended use, be directly applied singly or as combination of more than two compounds as defined by the above-mentioned general formula; or it may be prepared into oil, emulsifiable concentrate, wettable powder, dust, granules, aerosol or paste by dissolving, dispersing in, mixing with or adsorbing on an appropriate inactive carrier and, if desired, adding common adjuvants employed in the manufacture of agricultural chemicals. Thereby the compounding ratio of the active ingredient can be varied according to the need; in the case of dust or granules it is usually 1 to 10% and in the case of emulsifiable concentrate or wettable powder it is 10 to 90%. For practical use, the emulsifiable concentrate and the wettable powder may be adequately diluted and weighted 500 to 2,000 times with water, etc.

The inactive carrier to be applied for the insecticide of the present invention may be either solid or liquid. The applicable solids are, for example, talc, clay, bentonite, kieselguhr. The applicable liquids include alcohols such as methanol, ethanol and glycol, ketones such as acetone, methylethylketone and cyclohexanon, ethers such as dioxan and Cellosolve, aliphatic hydrocarbons, aromatic hydrocarbons such as benzene, toluene, xylene, solvent naphtha and methylnaphthalene, lower aliphatic esters, lower aliphatic amides such as dimethylformamide esters, lower ylacetamide, halogenated hydrocarbons, dimethylsulfoxide and other common organic solvents.

Examples of adjuvants are: Surfactants of non-ion, anion and cation system such as polyoxyethylene alkylarylether, alkylarylpolyethylene glycolether, alkylarylsulfonate, higher alcohol sulfuric acid ester and alkyldimethylbenzyl ammonium halide, lignin sulfonates, stearates, polyvinylalcohol, CMC, gum arabic, but the adjuvants available for this purpose are never limited to the above-mentioned.

Meanwhile, the insecticide according to the present invention may, without seriously detracting the effect of its active ingredient, contain one or more than two kinds of fertilizers, other insecticides, fungicides or herbicides or may be combined with them. For instance, the fungicides available for compounding or combination with the insecticide of this invention are Blasticidin-S or its salt, kasugamycin, polyoxin, pentachlorbenzylalcohol, pentachlorbenzalcyanhydrin, O,O-diethyl-S-benzylthiophosphate, and organic arsenic preparation. The other insecticides available are DDT, BHC, NAC, and metatolyl-N-methylcarbite. The herbicides available are PCP and 2,4-D. Of course, this list given here is not exhaustive.

In the following are cited several preferred examples of testing carried out to prove the insecticidal activity of the insecticide according to the present invention which contains the compounds of the general Formula I.

TEST 1

Insecticidal effect on *Nephotettix cincticeps* and *Laodelphax striatellus:* A potted rice plant ("Kameji") was liberally sprinkled with an emulsified dilute solution in a concentration of 200 p.p.m. of the insecticide according to the present invention which respectively contains the following compounds. After drying, with the leaf sheath cut off said plant was moved to a glass cylinder for water cultivation. A specified number of pests were let loose in the cylinder and after 24 hours at 25° C. they were checked for the fatality due to the insecticidal effect. The results are summarized in the following Tables I and II.

TABLE I

| Test compounds | Fatality (percent) | |
| --- | --- | --- |
|  | Nephotettix cincticeps (larva) | Laodelphax striatellus (adult) |
| The present invention: | | |
| (1) | 100 | 100 |
| (2) | 97 | 100 |
| (3) | 97 | 100 |
| Dimethyl (3-methyl-4-nitrophenyl) thiophosphate | 80 | 97 |
| Control | 0 | 0 |

TABLE II

| Test compounds | Fatality (percent) | |
| --- | --- | --- |
|  | Npehotettix cincticeps (larva) | Laodelphax striatellus (adult) |
| The present invention: | | |
| (5) | 100 | 100 |
| (6) | 100 | 100 |
| (7) | 100 | 96.7 |
| (8) | 100 | 100 |
| (9) | 100 | 100 |
| (10) | 100 | 100 |
| Dimethyl (3-methyl-4-nitrophenyl) thiophosphate | 50 | 96.7 |
| Control | 0 | 0 |

TEST 2

Insecticidal effect on *Chilo suppressalis* (pot test): A potted rice plant ("Kameji") was inoculated with larvae of *Chilo suppressalis* just after incubation which has been caught in the field. After one week, said plant was sprinkled with an emulsified dilute solution of the invented insecticide in a concentration of 500 p.p.m. Another week later, the leaf sheath was broken to check the insecticidal effect. The test was carried out at 23 to 42° C. in a greenhouse. The results are summarized in the following Tables III and IV.

TABLE III

| Test compounds | Inoculated | Number of pests | Alive | Dead | Survival rate (percent) | Fatality (percent) |
| --- | --- | --- | --- | --- | --- | --- |
| The present invention: | | | | | | |
| (1) | 60 | 25 | 0 | 25 | 0.0 | 100.0 |
| (2) | 60 | 30 | 0 | 30 | 0.0 | 100.0 |
| (3) | 60 | 27 | 1 | 26 | 1.7 | 96.3 |
| Parathion | 60 | 32 | 0 | 32 | 0.0 | 100.0 |
| Dimethyl (3-methyl-4-nitrophenyl) thiophosphate | 60 | 41 | 3 | 38 | 5.0 | 92.7 |
| Control | 60 | 39 | 36 | 3 | 60.0 | 7.7 |

TABLE IV

| Test compounds | Inoculated | Number of pests | Alive | Dead | Survival rate (percent) | Fatality (percent) |
| --- | --- | --- | --- | --- | --- | --- |
| The present invention: | | | | | | |
| (5) | 60 | 46 | 0 | 46 | 0 | 100.0 |
| (6) | 60 | 43 | 0 | 43 | 0 | 100.0 |
| (7) | 60 | 38 | 4 | 34 | 6.7 | 89.5 |
| (8) | 60 | 44 | 0 | 44 | 0 | 100.0 |
| (9) | 60 | 43 | 0 | 43 | 0 | 100.0 |
| (10) | 60 | 45 | 3 | 42 | 5 | 93.3 |
| (11) | 60 | 35 | 6 | 29 | 10 | 82.9 |
| Dimethyl (3-methyl-4-nitrophenyl) thiophosphate | 60 | 41 | 3 | 38 | 5 | 92.7 |
| Control | 60 | 35 | 32 | 3 | 53.3 | 8.6 |

TEST 3

Residual effect on *Nephotettix cincticeps:* The test was carried out in the same manner as in Test 2 with respect to *Nephotettix cincticeps.* The results are summarized in Table V.

TABLE V

| Test compounds | Fatality (percent) after— | |
|---|---|---|
| | Two days | Five days |
| The present invention: | | |
| (5) | 71.0 | 12.9 |
| (8) | 93.1 | 21.4 |
| (9) | 82.1 | 16.1 |
| Dimethyl (3-methyl-4-nitrophenyl) thiophosphate | 12.9 | 0 |
| O,O-dimethyl dithiophosphate of diethylmercaptosuccinate | 6.7 | 0 |
| Control | 10 | 0 |

Some preferred examples for synthesizing the organic phosphoric acid esters for use in the insecticide according to the present invention are given in the following:

EXAMPLE 1

The preparation of O-ethyl O-2-methoxyethyl O-p-nitrophenyl thiophosphate 6.4 grams of O-ethyl O-2-methoxyethyl chlorothiophosphate were dissolved in 20 millilitres of methylethylketone. 5 grams of 4-nitrophenol sodium salt were added to the solution while stirring at room temperature. The mixture was then agitated for reaction for four hours at the temperature in the range 60 to 80° C. After cooling it, 150 millilitres of water were added, whereby the precipitated inorganic salt was dissolved. The oily product separated was taken out with 150 millilitres of benzene. The benzenic layer was washed with a 5% aqueous sodium carbonate solution and then several times with water and was dried over anhydrous sodium sulphate. The benzene solvent was distilled off under a reduced pressure. Thereby, 8.9 grams of O-ethyl O-2-methoxyethyl O-p-nitrophenyl thiophosphate were obtained as a pale yellowish liquid. The yield: 92%, $n_D^{20}$ 1.5280.

EXAMPLE 2

The preparation of O-ethyl O-2-ethoxyethyl O-p-nitrophenyl thiophosphate 9.2 grams of O-2-ethoxyethyl chlorothiophosphate were reacted with 6.5 grams of 4-nitrophenol sodium salt and 25 millilitres of methylethylketone completely in the same manner as in Example 1, producing 12.2 grams of O-ethyl O-2-ethoxyethyl O-p-nitrophenyl thiophosphate. The yield: 91%, $n_D^{20}$ 1.5237.

EXAMPLE 3

The preparation of O-methyl O-2-ethoxyethyl O-p-nitrophenyl thiophosphate 8.7 grams of O-methyl O-2-ethoxyethyl chlorothiophosphate were reacted with 25 millilitres of methylethylketone and 6.5 grams of 4-nitrophenol sodium salt completely in the same manner as in Example 1, producing 11.3 grams of O-methyl O-2-ethoxyethyl O-p-nitrophenyl thiophosphate. The yield: 88%, $n_D^{20}$ 1.5292.

EXAMPLE 4

The preparation of O-methyl O-2-methoxyethyl O-p-nitrophenyl thiophosphate 7.8 grams of O-methyl O-2-methoxyethyl chlorothiophosphate were reacted with 6.2 grams of 4-nitrophenol sodium salt and 20 millilitres of methylethylketone completely in the same manner as in Example 1, producing 10.4 grams of O-methyl O-2-methoxyethyl O-p-nitrophenyl thiophosphate. The yield: 90%, $n_D^{20}$ 1.5384.

EXAMPLE 5

The preparation of O-isopropyl O-2-methoxyethyl O-p-nitrophenyl thiophosphate 6.9 grams of O-isopropyl O-2-methoxyethyl chlorothiophosphate were reacted with 25 millilitres of methylethylketone and 5.0 grams of 4-nitrophenol sodium salt completely in the same manner as in Example 1, producing 9.0 grams of O-isopropyl O-2-methoxyethyl O-p-nitrophenyl thiophosphate. The yield: 90%, $n_D^{20}$ 1.5235.

EXAMPLE 6

The preparation of O-ethyl O-2-methoxyethyl O-p-nitrophenyl thiophosphate 5.6 grams of 4-nitrophenol were dissolved in 25 millilitres of methylethylketone. 5.6 grams of powdered potassium carbonate were added to the solution, which was then heated up to 60° C., while stirring for 30 minutes. After cooling it, 8.8 grams of O-ethyl O-2-methoxyethyl chlorothiophosphate were added dropwise to the mixed solution, which was then heated to 60 to 80° C. and reacted for 5 hours. After cooling to room temperature, the resultant mixture was added with water, whereby the precipitated inorganic salt was dissolved and the oily product separated was taken out with benzene. The benzenic layer was fully washed with water and dried over anhydrous sodium sulphate. The benzene solvent was distilled off under a reduced pressure, whereby 11.7 grams of O-ethyl O-2-methoxyethyl O-p-nitrophenyl thiophosphate were obtained as a transparent, pale yellowish liquid. The yield: 91%.

In the following are illustrated some examples of the insecticidal composition according to the present invention, but of course these do never exhaust the possibilities of this invention. The parts indicated are invariably weight parts.

EXAMPLE I

An emulsifiable concentrate obtained by blending the following items:

| | Parts |
|---|---|
| O-ethyl O-2-methoxyethyl O-p-nitrophenyl thiophosphate | 50 |
| Xylene | 40 |
| Mixture of polyoxyethylenenonylphenylether and alkylbenzene sulfonic acid calcium | 10 |

EXAMPLE II

An emulsifiable concentrate obtained by blending the following items:

| | Parts |
|---|---|
| O-methyl O-2-methoxyethyl O-4-nitrophenyl thiophosphate | 50 |
| Xylene | 40 |
| Mixture of polyoxyethylenenonylphenylether and alkylbenzene sulfonic acid calcium | 10 |

EXAMPLE III

Dust preparation obtained by blending and crushing the following items:

| | Parts |
|---|---|
| O-ethyl O-2-ethoxyethyl O-p-nitrophenyl thiophosphate | 3 |
| Mixture of talc and clay | 97 |

EXAMPLE IV

Dust preparation obtained by blending and crushing the following items:

| | Parts |
|---|---|
| O-methyl O-2-ethoxyethyl O-p-nitrophenyl thiophosphate | 3 |
| Mixture of talc and clay | 97 |

EXAMPLE V

Granular preparation obtained by blending and granulating the following items:

| | Parts |
|---|---|
| O-ethyl O-2-isopropoxyethyl O-p-nitrophenyl thiophosphate | 5 |
| Bentonite | 35 |
| Clay | 55 |
| Lignin sulfonic acid ammonium | 5 |

EXAMPLE VI

Granular preparation obtained by blending and granulating the following items:

| | Parts |
|---|---|
| O-methyl O-2-isopropoxyethyl O-p-nitrophenyl thiophosphate | 5 |
| Bentonite | 35 |
| Clay | 55 |
| Lignin sulfonic acid ammonium | 5 |

What is claimed is:

1. An insecticide composition comprising an insecticidal amount of at least one of the organic phosphoric acid esters having the formula:

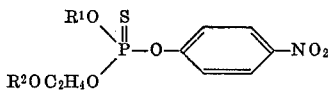

wherein $R^1$ is $C_2H_5$ and $R^2$ is lower alkyl and an inert carrier.

2. The insecticide composition of claim 1, wherein said organic phosphoric acid ester is O-ethyl O-2-methoxyethyl O-p-nitrophenyl thiophosphate.

3. The insecticide composition of claim 1, wherein said organic phosphoric acid ester is O-ethyl O-2-ethoxyethyl O-p-nitrophenyl thiophosphate.

4. The insecticide composition of claim 1, wherein said organic phosphoric acid ester is O-ethyl O-2-isopropoxyethyl O-p-nitrophenyl thiophosphate.

5. The insecticide composition of claim 1, wherein said organic phosphoric acid ester is O-ethyl O-2-n-propoxyethyl O-p-nitrophenyl thiophosphate.

6. A process for protecting agricultural plants against insects comprising applying to said agricultural plants an effective insecticidal amount of a compound having the formula

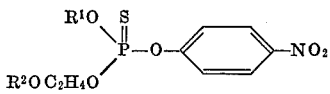

in which $R^1$ and $R^2$ are lower alkyl.

7. The process of claim 6 in which said agricultural plants are rice plants.

8. The process of claim 6 in which said compound is selected from the group consisting of O-ethyl-O-2-methoxyethyl O-p-nitrophenyl thiophosphate, O-ethyl O-2-ethoxyethyl O-p-nitrophenyl thiophosphate, O-ethyl O-2-isopropoxy-ethyl O-p-nitrophenyl thiophosphate, O-ethyl O-2-n-propoxyethyl O-p-nitrophenyl thiophosphate, O-methyl O-2-methoxyethyl O-p-nitrophenyl thiophosphate, O-methyl O-2-ethoxyethyl O-p-nitrophenyl thiophosphate, O-isopropyl O-2-methoxyethyl O-p-nitrophenyl thiophosphate, O-methyl O-2-isopropoxyethyl O-p-nitrophenyl thiophosphate, O-methyl O-2-propoxyethyl O-p-nitrophenyl thiophosphate, O-methyl O-2-butoxyethyl O-p-nitrophenyl thiophosphate, and O-isopropyl O-2-ethoxyethyl O-p-nitrophenyl thiophosphate.

9. A process for killing insects comprising contacting said insects with an insecticidal amount of a compound having the formula

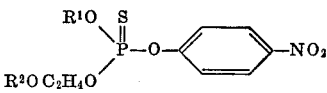

in which $R^1$ and $R^2$ are lower alkyl.

10. The process of claim 9, in which said insects are selected from the group consisting of *Nephotettix cincticeps*, *Chilo suppressalis* and *Laodelphax striatellus*.

11. The process of claim 9, in which said insects are acarids.

References Cited

UNITED STATES PATENTS

| | | | |
|---|---|---|---|
| 3,048,517 | 8/1962 | Chupp | 424—218 |
| 3,170,835 | 2/1965 | Godfrey | 424—218 |

OTHER REFERENCES

Chem. Abst. 70, 3524e (1969), refers to 1968 article and patent.

JEROME D. GOLDBERG, Primary Examiner

V. D. TURNER, Assistant Examiner

U.S. Cl. X.R.

424—218; 260—950

UNITED STATES PATENT OFFICE
CERTIFICATE OF CORRECTION

Patent No. 3,703,599          Dated November 21, 1972

Inventor(s) ZITSUICHI KISHIKAWA and SADAFUMI MAEKAWA

It is certified that error appears in the above-identified patent and that said Letters Patent are hereby corrected as shown below:

Claims the priority of Japanese applications Nos. SHO 43-2384 and SHO-43 35095 filed in Japan January 18, 1968 and May 25, 1968 respectively.

Signed and sealed this 3rd day of April 1973.

(SEAL)
Attest:

EDWARD M. FLETCHER, JR.          ROBERT GOTTSCHALK
Attesting Officer                Commissioner of Patents